May 24, 1938.  E. VAN ARSDEL  2,118,540
AUTO STEERING WHEEL HANDGRIP
Filed May 10, 1937
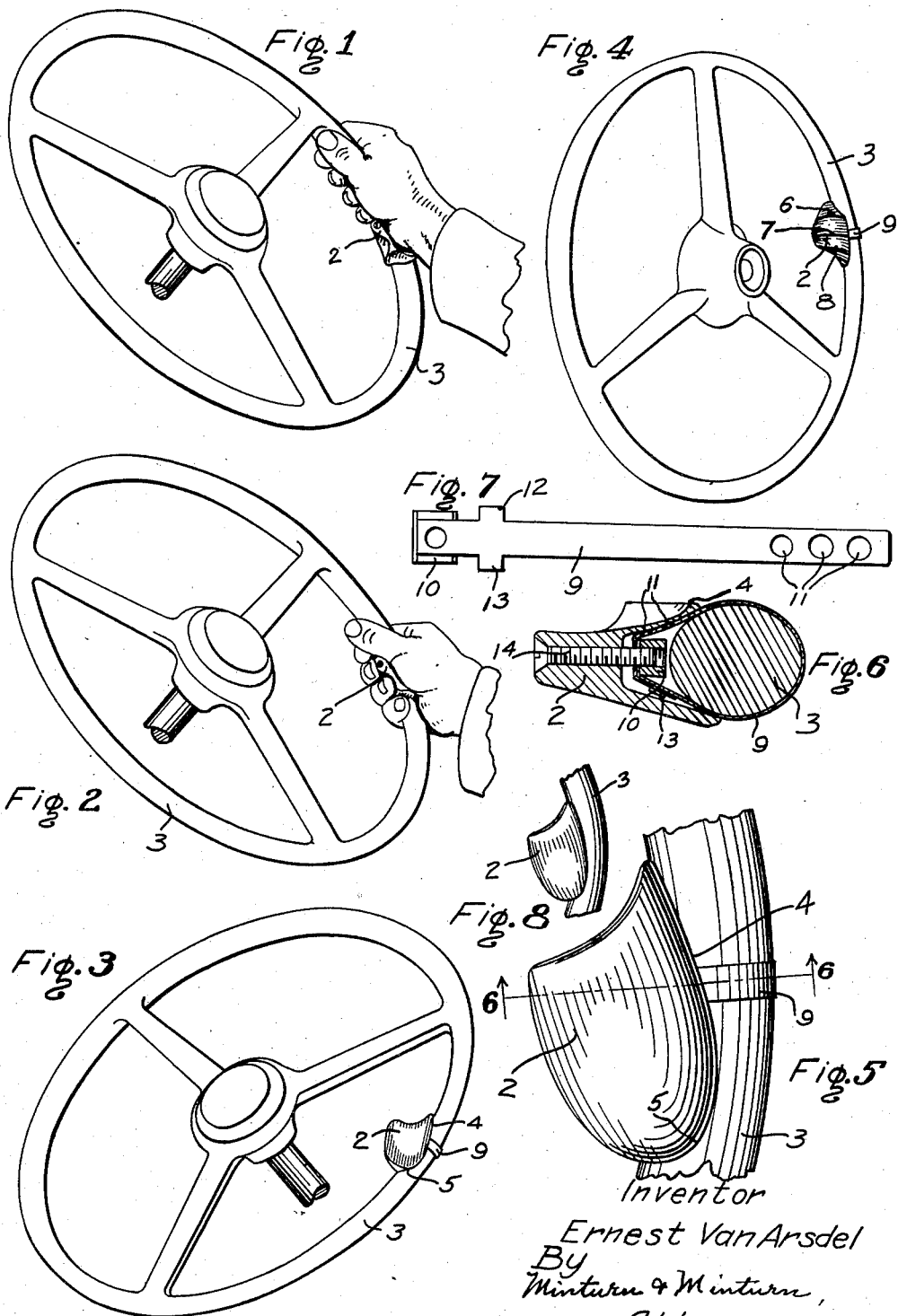
Inventor
Ernest Van Arsdel
By
Minturn & Minturn,
Attorneys Patented May 24, 1938

2,118,540

UNITED STATES PATENT OFFICE 2,118,540

AUTO STEERING WHEEL HANDGRIP

Ernest Van Arsdel, Indianapolis, Ind.

Application May 10, 1937, Serial No. 141,598

3 Claims. (Cl. 74—557)

The object of this invention is to provide a grip on automobile steering wheels for the hand of an operator which will be comfortable for his thumb and fingers and which will keep the hand in a proper steering position.

A further and very important object is to provide a second equally comfortable support in the same device, in which the bottom of the hand by which I mean that part of the hand in line with the little finger may rest on a concave surface shaped especially to receive it while the fingers are clasped easily around the steering wheel rim ready for quick action, making it easy to shift from one position to the other in order to keep the hand and arm rested and free from the cramp or strain that generally results from driving for any considerable distance with the hand held in one position.

Another object is to provide a hand rest that will extend partially across the steering wheel rim and inwardly of the rim but not outwardly of it, and which will perform the function of a safety grip and a hand rest in a new and better way.

The object also is to provide a simple and inexpensive means for fastening my invention to a steering wheel so it can be adjusted to suit the convenience of the operator and then secured against accidental displacement in use.

This is a continuation in part of an application for a patent for an Auto steering wheel hand grip filed by me on January 27, 1937, Serial No. 122,510.

I accomplish the above objects and other objects which will hereinafter appear and will be pointed out in the claims by the means illustrated in the accompanying drawing, in which Fig. 1 is a perspective view of a steering wheel equipped with my invention and showing the bottom of the hand of the operator by which I mean that part of the hand in line with the little finger resting on the concave surface with the fingers clasped easily around the steering wheel rim.

Fig. 2 is a like view of the wheel with my invention and with the thumb and fingers of the operator in proper driving position.

Fig. 3 is a perspective view of the upper side of the wheel and my invention in operative position with the operator's hand removed.

Fig. 4 is a perspective view of the under side of the same wheel shown in Fig. 3.

Fig. 5 is a fragment of a wheel rim in top plan view with my invention attached.

Fig. 6 is a section on the line 6—6 of Fig. 5.

Fig. 7 is a plan view in the flat of the metal band and attached nut which form part of the means for attaching my invention to the wheel rim, and Fig. 8 is a modification showing the grip-rest permanently attached to the rim.

Like characters of reference indicate like parts in the several views of the drawing.

Ordinarily, one hand rest attached to the steering wheel rim on the right side is sufficient for comfortable driving for the reason that most modern cars have an arm rest on the inside of the left front door to take the strain off of the left arm and hand.

The grip-rest 2 is concave longitudinally and about half of the rest extends over and part way across the steering wheel rim 3 in a manner to slope downwardly and inwardly of the rim. The outer edge 4 of the side, and 5 of the rear end of the concave, located above the rim, extends up into a marginal flange to be contacted by the inside of the ball of the thumb or by the bottom of the hand, depending upon which part of the hand is seated on the rest. These flanges 4 and 5 enable the operator instantly to feel any deviation of the car from a straight course and gives him something substantial to push against in resistance and also in rotating the wheel to steer the car around corners and curves and away from obstructions or bad places in the roadway.

The rotation of the steering wheel by hand pressure against flanges 4 and 5 is assisted by the palm and fingers which are wrapped around the rim of the wheel, and to increase the fingerhold the grip-rest 2, which is thickened and bifurcated to straddle the rim as shown in Fig. 6, is provided with recesses separated by ridges, here shown as three in number, 6, 7, and 8. The ends of the three last fingers of the operator's hand are seated in the recesses with the rib 6, 7, and 8, respectively, separating the fingers and increasing the grip of the hand on the wheel.

The weight of the hand and arm are comfortably supported with the bottom of the hand resting in the concavity of the grip-rest as shown in Fig. 1, or with the ball of the thumb seated in the concavity as shown in Fig. 2, and the two optional positions afford opportunity for change which will keep the hand and arm from the cramp or strain from long driving.

My improved grip-rest may be formed integrally with the rim of the steering wheel as shown in Fig. 8, but I prefer to make it removable as an attachment for any make of car and also to make it adjustable to suit the requirements or fancy of the driver.

I will now describe the means, illustrated in the drawing, for removably and adjustably securing the grip-rest to the wheel rim.

I form a band 9 of thin strap metal, to one end of which I fix a preferably tapering and threaded nut 10, and provide a hole through the band which registers with the threaded hole of the nut. At the other end of the strap, is a series of holes 11, and near the first end at a short distance from the nut are ears 12 and 13, integral with the strap.

Entering from the inner edge of the grip-rest is a hole which terminates in the bifurcation of the rest. This hole loosely receives a screw bolt 14.

In making an assembly the band 9 is wrapped around the wheel rim and the free end of the band is laid across the nut and bent past the ears 12 and 13 with one of the holes 11 in register with the hole at the nut, the ears 12 and 13 are then bent toward each other to clamp and hold this assembly. Then the grip-rest is placed as shown in Fig. 6, with its bifurcation receiving the nut and adjacent fasteners of the band and rim, and the threaded end of the screw bolt 14 is screwed into the nut 10 until the grip-rest is immovably tightened upon the rim of the wheel.

The grip-rest may be shifted along the length of the rim, or vertically around it by reversing the screw sufficiently to permit change of the rest to the new position, where it will be held again by tightening up on the screw.

Should the nut become detached from the strap after the screw has entered the nut the assembly will still be retained.

It is obvious that variations in the means of attachment and size and shape of the grip-rest and material may be varied without departing from the spirit of my invention, and I therefore do not desire to be limited more than is required by the appended claims.

I claim:

1. For an automobile steering wheel rim, a hand grip confined substantially entirely within the periphery of the rim and having a major upper surface transversely concave extending inwardly from the top of the rim and curving longitudinally downwardly and around toward the under side of the rim and there terminate; the inside edge of the grip defining said surface curving upwardly from the lower rear end and thence downwardly and across to the lower inside of the rim; a major ridge extending downwardly from under said up-curved portion of said edge and outwardly toward the under side of the rim in substantial parallelism with the forward downwardly curving portion of said edge; said major ridge being spaced therefrom by a concave surface; and a second ridge spaced by a concave surface back of the first ridge in substantial parallelism thereto but in closer proximity to the rim; the grip being proportioned to have said upper surface receive the base of the driver's thumb in one position therealong with his fingers carried around the steering wheel rim to have the index finger come around ahead and above said grip, the second finger turned up along said first under concave surface, the third finger in said second under concave surface, and the small finger behind or below the grip into contact with the inner side of the rim.

2. For an automobile steering wheel rim, a hand grip confined substantially entirely within the periphery of the rim and having a major upper surface transversely concave extending inwardly from the top of the rim and curving longitudinally downwardly and around toward the under side of the rim and there terminate; the inside edge of the grip defining said surface curving upwardly from the lower rear end and thence downwardly and across to the lower inside of the rim; a major ridge extending downwardly from under said up-curved portion of said edge and outwardly toward the under side of the rim in substantial parallelism with the forward downwardly curving portion of said edge; said major ridge being spaced therefrom by a concave surface; and a second ridge spaced by a concave surface back of the first ridge in substantial parallelism thereto but in closer proximity to the rim; the grip being proportioned to have said upper surface receive the base of the driver's thumb in one position therealong with his fingers carried around the steering wheel rim to have the index finger come around ahead and above said grip, the second finger turned up along said first under concave surface, the third finger in said second under concave surface, and the small finger behind or below the grip into contact with the inner side of the rim, the rear and lower edge of the grip about said upper surface being slightly upturned.

3. For an automobile steering wheel rim, a hand grip confined substantially entirely within the periphery of the rim and having a major upper surface transversely concave extending inwardly from the top of the rim and curving longitudinally downwardly and around toward the under side of the rim and there terminate; the inside edge of the grip defining said surface curving upwardly from the lower rear end and thence downwardly and across to the lower inside of the rim; a major ridge extending downwardly from under said up-curved portion of said edge and outwardly toward the under side of the rim in substantial parallelism with the forward downwardly curving portion of said edge; said major ridge being spaced therefrom by a concave surface; and a second ridge spaced by a concave surface back of the first ridge in substantial parallelism thereto but in closer proximity to the rim; the grip being proportioned to have said upper surface receive the base of the driver's thumb in one position therealong with his fingers carried around the steering wheel rim to have the index finger come around ahead and above said grip, the second finger turned up along said first under concave surface, the third finger in said second under concave surface, and the small finger behind or below the grip into contact with the inner side of the rim; said grip being demountable, a screw passing through the grip from the inner upper portion thereof, a band transversely encircling said rim and terminating with overlapped ends inside the grip; and said screw passing through said ends and engaging a member between those ends and the rim.

ERNEST VAN ARSDEL.